INVENTOR
F. R. ASHLEY
BY
Roderick B. Anderson
ATTORNEY

United States Patent Office 3,443,249
Patented May 6, 1969

3,443,249

WAVE LIMITER CIRCUIT AND APPARATUS

Francis R. Ashley, South Plainfield, N.J., assignor to Bell Telephone Laboratories, Incorporated, Murray Hill, N.J., a corporation of New York Filed Nov. 22, 1966, Ser. No. 596,232
Int. Cl. H04b *3/04;* H01p *5/14*
U.S. Cl. 333—17 7 Claims

ABSTRACT OF THE DISCLOSURE

A wave limiter circuit having a transmission line connected at one end to a directional coupler and at another end to a dissipating resistance. Two pairs of oppositely poled forward-biased diodes are connected across the transmission line in parallel with the dissipating resistance. Wave energy from the directional coupler is reflected by the diodes and the resistance and is transmitted by the directional coupler to a load. For optimum limiting, the diodes are biased by a constant-current source and the dissipating resistance is larger than the input resistance. Input wave energy may also be modulated by varying the bias current.

This invention relates primarily to limiters, and more particularly, to limiters used for amplitude modulation suppression.

In FM communications systems, limiter circuits are frequently used to suppress spurious amplitude variations of the frequency modulated carrier wave. It would seem at first glance that one could effectively suppress amplitude modulation by "clipping" the FM carrier wave; that is, by suppressing all carrier wave voltage excursions that exceed some positive the negative maximum voltages. The paper, "Amplitude Modulation Suppression in FM Systems," by C. L. Ruthroff, Bell System Technical Journal, vol. 37, No. 4, July 1958, pages 1023–1046, points out, however, that mere clipping is not very effective in suppressing amplitude modulation. A received FM signal is composed of a carrier containing FM sidebands, together with the spurious AM sideband components. An ideal limiter for AM suppression should remove AM sidebands without disturbing FM sideband composition; conventional clipping does not completely suppress the AM sidebands and is inefficient in that it constitutes an undue loss to the desired signal.

Ruthroff describes limiter circuits using diodes in series with the line that transmits the signal to be limited. Unfortunately, these series circuits cannot be used for limiting microwave frequency signals because of the unavoidable diode reactance at such high frequencies. Some well-known limiters use parallel connected diodes, but they do not give effective AM modulation suppression for the reasons pointed out in the Ruthroff article. Further, such circuits almost invariably use capacitors in the diode bias circuit which prevent the type of nonlinear operation described in the Ruthroff article required for effective AM suppression.

Accordingly, it is an object of this invention to provide an improved limiter circuit.

It is another object of this invention to provide an improved limiter circuit which will operate at microwave frequencies.

It is still another object of this invention to increase the AM suppression and decrease the FM distortion of microwave limiter circuits.

These and other objects of the invention are attained in an illustrative embodiment thereof comprising a four-port directional coupler of the type commonly known as a "3 db coupler." Input microwave power is applied to a first port of the coupler, identical limiter circuits are connected to second and third ports, and output power, which is reflected from the limiter circuits, is removed at a fourth port. The limiter circuits each operate in a reflection mode; that is, the output of each limiter circuit is taken as the power reflected from the circuit back toward the directional coupler. In accordance with the invention, output power is limited by variable absorption in a dissipating resistance in each of the limiter circuits.

Each limiter circuit comprises two pairs of oppositely poled forward-biased diodes in parallel with the dissipating resistance. The cathode contacts of one pair of diodes are connected through the bias source with the anode contacts of the other pair. When the input microwave source current is low, the diodes are conducting and the input power is reflected back to the directional coupler and thence to the output. When the input source current exceeds the diode bias current, power is absorbed by the dissipating resistance. As will be explained more fully later, the load resistance is mismatched to the source resistance, which gives a nonlinear power absorption as required for most effective AM suppression. If so desired, the limiter circuit may be modified for use as an AM modulator by varying the diode bias at a modulation frequency.

These and other objects, features, and advantages of the invention will be better understood from a consideration of the following detailed description, taken in conjunction with the accompanying drawing in which.

Figure 1:
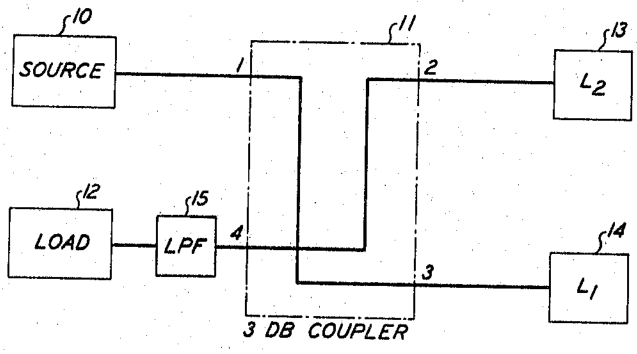
FIG. 1 is a schematic illustration of a transmission circuit, including limiter circuits, in accordance with an illustrative embodiment of the invention.

Referring now to FIG. 1, there is shown a transmission circuit comprising a source 10 of frequency-modulated microwave input power, a directional coupler 11 and a load 12. The directional coupler is of the type known in the art as a quarter-wave 3 db coupler having an input port designated port 1, an output port designated port 4, and two other ports, ports 2 and 3, to which are connected limiter circuits 13 and 14. The purpose of the limiters 13 and 14 is to limit the incident power from source 10 which is delivered through port 4 to the load 12; more specifically, its purpose is to suppress spurious AM components of the signal wave. At low power levels the limiters reflect incident power back to the directional coupler 11 and hence to the load 12. As is known, power incident at ports 2 and 3 add in phase at port 4, but add out of phase at port 1; as a result all of the reflected power from the limiters is delivered to port 4. The construction and operation of directional couplers of the type shown in FIG. 1 are described in the book Microwave Filters, Impedance Matching and Coupling Structures by G. L. Matthaei, L. Young, and E. M. T. Jones, McGraw-Hill Book Company, pages 775–780. A low-pass filter 15 is included in the output line for suppressing harmonics of the signal carrier wave. The filter suppresses frequencies equal to twice the signal frequency and above, but does not suppress the upper FM sideband frequencies.

Figure 2:
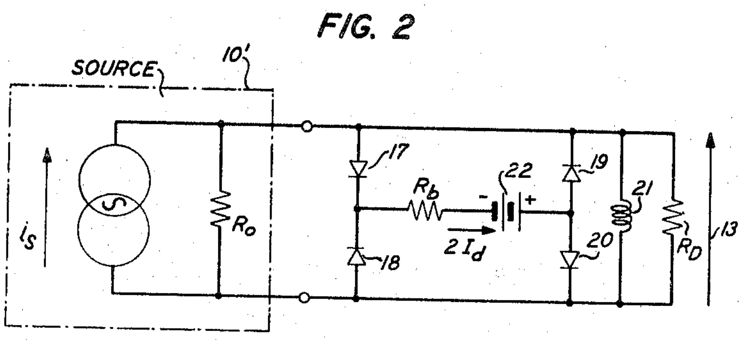
FIG. 2 is a schematic illustration of a limiter circuit of the type used in the embodiment of FIG. 1.

Referring to FIG. 2, the portion of the circuit included in box 10' is an equivalent circuit of the source 10 and directional coupler 11 as "seen" by the limiter 13. The limiter 13, which is identical to the limiter 14, comprises oppositely-poled diodes 17 and 18 and oppositely-poled diodes 19 and 20 which are connected in parallel to a dissipating resistance $R_D$. The cathode contacts of diodes 17 and 18 are connected by way of a battery resistor $R_b$ to the negative terminal of bias source 22 while the anode contacts of diodes 19 and 20 are connected to the positive terminal of bias source 22. The resistor $R_b$ is much larger than $R_D$ to preclude R-F current flow between the diode pair 17–18 and the diode pair 19–20; that is, the source 22 and the battery $R_b$ together constitute a constant-current source which supplied a bias current $2I_d$ as shown. The source 22 forward-biases the diodes 17, 18, 19, and 20 at a current which determines the maximum power of R-F energy that is reflected back to the directional coupler in response to incident R-F power; the limiter circuit thereby limits the R-F power delivered to the load of FIG. 1. An inductor 21 is included in parallel with the diodes to "tune out" parasitic capacitances of the diodes; the inductor and the capacitances of the diodes are resonant at the fundamental frequency.

When the source current $i_s$ is smaller than the bias current $I_d$, the forward-biased diodes are effective short-circuits, and the source current is reflected back to the directional coupler. If $i_s$ reaches a large negative value, diodes 17 and 20 become back-biased by the large negative R-F voltage, causing incident power to be absorbed by the load resistance $R_D$. For large positive values of $i_s$, diodes 18 and 19 become back-biased, constitute open circuits, and again, incident power is absorbed by $R_D$.

Figure 3:
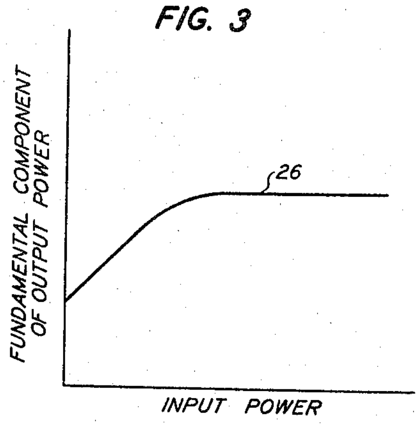
FIG. 3 is a graph of input power versus the fundamental component of output power of the circuit of FIG. 1.

From the foregoing it can be appreciated that if, due to spurious amplitude modulation of the signal wave, the power of the waves exceeds a threshold, excess power will be absorbed by the dissipating resistance. FIG. 3 shows a curve 26 which represents the optimum variation of output power as a function of input power for effective AM suppression. As is seen by this curve, the output power is proportional to the input power until the input power reaches some threshold value after which the output power remains substantially constant.

Figure 4:
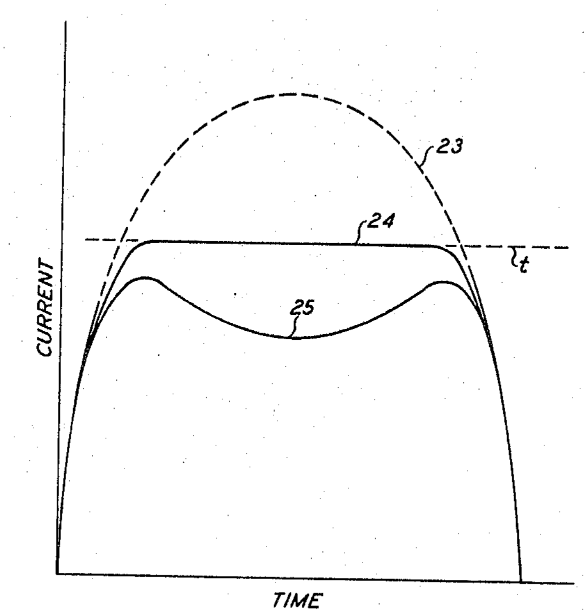
FIG. 4 is a graph showing the waveform of reflected voltages of the limiter circuit of FIG. 2.

It would seem at first glance that one could achieve the desired characteristic of FIG. 3 by clipping the waveform of the incident R-F wave. Referring to FIG. 4, assume that curve 23 represents the current of the incident R-F wave and $t$ represents the D-C diode bias current which corresponds to the maximum limited output power. If wave 23 is clipped, the output clipped wave will have the configuration shown by curve 24. As is pointed out in the Ruthroff article, however, clipping to give waveforms such as curve 24 does not result in the desired input-output characteristic as shown in FIG. 3 because clipping does not completely suppress AM sideband frequencies. When one considers the Fourier components of the waveform of curve 24, one can appreciate that curve 24 has a fundamental component with an amplitude that will extend above the threshold $t$, and this fundamental amplitude increases with increasing source current. It can be shown that the output waveform of an ideal limiter should have a configuration of the type shown by curve 25 in order to give effective AM suppression.

It can be further shown that the microwave current $i_-$ that is reflected by the circuit of FIG. 2 back to the directional coupler is given by the equation, $$i_- = \frac{R_m}{R_O}\left[2i_d - \tfrac{1}{2}\left(1 - \frac{R_O}{R_D}\right)i_s\right] \quad (1)$$

where $R_O$ is the source resistance shown in the equivalent circuit 10' of FIG. 2, $R_D$ is the dissipating resistance; $i_s$ is the microwave source current, $R_m$ is given by the equation, $$R_m = \frac{R_O R_D}{R_O + R_D} \quad (2)$$

and $i_d$ is a current obtained by the relation, $$\frac{i_d}{I_d} + \frac{R_O + R_D}{2\beta R_g R_D I_d} \ln\left[\frac{1 + i_d/I_d}{1 - i_d/I_d}\right] = \frac{i_s}{2I_d} \quad (3)$$

where $\beta$ is a parameter of the diode describing current flow I through the diode in response to applied voltage $v$ according to the relation, $$I = I_s\,(e^{\beta v} - 1) \quad (4)$$

where $I_s$ is the reverse saturation current of the diode.

Careful analysis of Equation 1 shows that when the quantity $R_O/R_D$ is equal to 1, the waveform is clipped and the output waveform of the reflected current $i_-$ has the configuration shown by curve 24. However, if the quantity $R_O/R_D$ is less than 1, the dissipating resistance is mismatched to the input impedance, and the output waveform has the shape shown by curve 25. The precise shape of the waveform 25 required for giving the ideal limiting illustrated by curve 26 of FIG. 3 depends on the parameters of the components used in the circuit. With the aid of Equation 1, which gives the reflected current from the limiter of the present invention, and by using the criteria set forth in the Ruthroff article for giving ideal limiting, one skilled in the art can design any of a number of circuits operating at various frequencies for giving optimum limiting at any desired power level.

For example, in one circuit which has been built, the optimum ratio of $R_O$ to $R_D$ was computed and experimentally verified as being .77, with circuit parameters as follows: frequency, 1300 kilomegacycles per second; $R_O$, 50 ohms; $\beta$, 36; $I_d$, 2.5 milliamps; power threshold, +5 dbm; output power, 4 dbm. Shottky-barrier diodes were used in the circuit because of their low series resistance and because they have no substantial charge storage mechanism. While the precise ratio of $R_O$ to $R_D$ required for giving effective AM suppression may vary, $R_D$ in any case should always be greater than $R_O$ for giving the waveform of the type shown by curve 25 of FIG. 4. If $R_D$ is equal to $R_O$, the waveform, as mentioned before, has the shape described by curve 24, and if $R_D$ is less than $R_O$, the waveform has a shape described by a curve lying between curves 23 and 24 of FIG. 4. If so desired, the proper value of dissipating resistance may be determined empirically by using a variable resistance for $R_D$ and adjusting it to give the desired power characteristic shown in FIG. 3.

While the proper ratio of $R_O/R_D$ gives effective AM suppression, it does not prevent the amplitude modulation to phase modulation conversion which is frequently the cause of FM distortion in limiters. If the diodes 17–20 have a capacitance that changes with amplitude, the phase of the output wave will be shifted to distort the FM signal. Typical junction diodes of the type presently commercially available operate on a charge storage principle, do not meet this requirement, and therefore generally distort the FM signal. However, metal-semiconductor diodes such as Schottky-barrier diodes and point-contact diodes operate on a different principle, do not give undesirable phase shift, and in addition, have a sufficiently small response time to be used at microwave frequencies.

Figure 5:
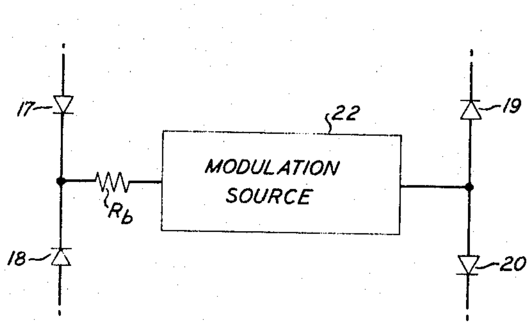
FIG. 5 is a schematic illustration of part of the circuit of FIG. 2, showing how that circuitry may be modified for use as a modulator.

As is apparent from Equations 1 and 3, the reflected current $i_-$ is directly proportional to the bias current $I_d$, which suggests that the bias current could be used to amplitude modulate the incident R-F energy. A modification of the limiter circuit to function as a modulator is shown in FIG. 5 in which a modulation source 22' has been substituted for the D-C battery 22 of FIG. 2. With this provision, the amplitude of reflected R-F current will be directly proportional to the amplitude of applied modulation current, provided the incident R-F power is always higher than the threshold of limiting power for the device.

While the arrangement shown in FIG. 1 is preferred, it is to be understood that my limiter circuit could be used with directional couplers other than that shown, or in conjunction with a circulator for separating the input power from the output power. The limiter circuit will work with only one pair of oppositely-poled diodes, but this introduces problems of symmetry at microwave frequencies. Two pairs of diodes can be used to load symmetrically a microwave strip transmission line, but a single pair can lead to problems of non-symmetrical loading.

Various other modifications may be made by those skilled in the art without departing from the spirit and scope of the invention.

What is claimed is:

1. A reflection mode circuit for transmitting high frequency energy from an input source to a load comprising:
a transmission line comprising a pair of conductors coupled at a first end to the input source of high frequency energy and to the load;
a dissipating resistance connected between the conductors at a second end of the transmission line;
two pairs of series-connected diodes, the cathode contacts of one diode pair being interconnected and the anode contacts of the other diode pair being interconnected;
each diode pair being connected to the conductors in parallel with the dissipating resistance;
means connected to the contact interconnections of the diode for forward biasing all of the diodes, whereby only high frequency power in the conductors having a current that exceeds the diode bias current is transmitted to the dissipating resistance, the remaining high frequency power being reflected back toward the first end of the transmission line;
and means comprising a directional coupler connected to the first end of the transmission line for directing high frequency energy from the source to the transmission line and for directing reflected high frequency energy from the transmission line to the load.

2. The circuit of claim 1 wherein:
said circuit is a limiter circuit;
the input source includes an input resistance;
and the dissipating resistance is greater than the input resistance, whereby the load is mismatched to the source which causes nonlinear absorption of input power by the dissipating resistance.

3. The circuit of claim 1 wherein:
said circuit is a modulator circuit;
and the biasing means comprises a variable amplitude modulation source for forward biasing the diodes at different currents, thereby amplitude modulating the power that is reflected back toward the source.

4. The limiter circuit of claim 2 wherein:
the high frequency energy is microwave energy;
and the means for forward biasing the diodes includes a resistance that is much higher than the load resistance to substantially preclude microwave current through the biasing means.

5. The limiter circuit of claim 4 wherein:
all the diodes are metal-semiconductor diodes of substantially identical electrical characteristics.

6. A limiter circuit comprising:
a pair of conductors coupled to an input source of high frequency current, said source having an input resistance;
a dissipating resistance connected between the conductors;
at least one pair of identical oppositely-poled diodes connected to the conductors in parallel with the dissipating resistance;
the dissipating resistance being greater than the input resistance;
means comprising a substantially constant-current source for forward-biasing the diodes and for transmitting through the diodes a direct current which is smaller than the maximum amplitude of the high frequency current;
and means for directing high frequency current that may be reflected from the diodes and the dissipating resistance to a load.

7. The limiter circuit of claim 6 wherein:
the diodes are metal-semiconductor diodes.

References Cited

UNITED STATES PATENTS

| | | | |
|---|---|---|---|
| 1,825,304 | 9/1931 | Burnside | 332—47 |
| 2,003,428 | 6/1935 | Cowan. | |
| 2,205,843 | 6/1940 | Caruthers. | |
| 2,293,628 | 8/1942 | Reiling. | |
| 2,373,569 | 4/1945 | Kannenberg. | |
| 2,682,640 | 6/1954 | Harling | 332—47 |

OTHER REFERENCES

Van Winkle: "Sine Wave Amplitude Limiter," IBM Technical Disclosure Bulletin, vol. 2, No. 4, December 1959, pp. 29, 30 (323–9).

JOHN F. COUCH, *Primary Examiner.*

A. D. PELLINEN, *Assistant Examiner.*

U.S. Cl. X.R.

323—81; 332—47; 333—10